Aug. 9, 1932.  F. H. SHEPARD  1,870,469
LOCOMOTIVE CONTROL SYSTEM
Filed April 4, 1930   2 Sheets-Sheet 2
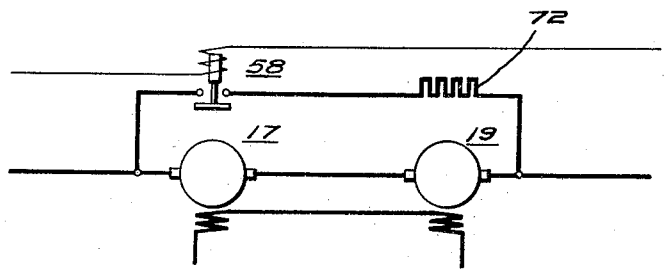
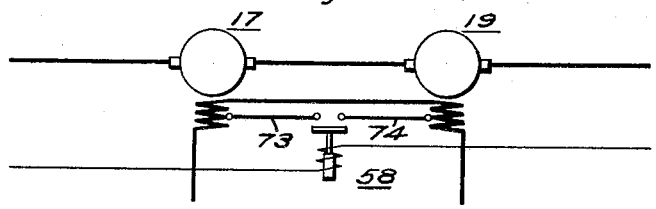
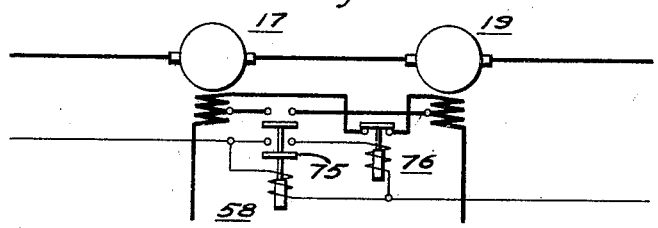
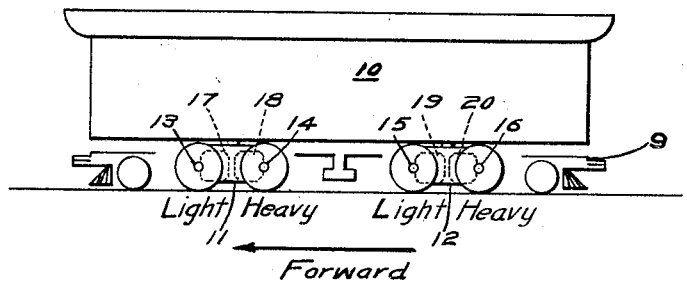
INVENTOR
Francis H. Shepard
BY
ATTORNEY Patented Aug. 9, 1932

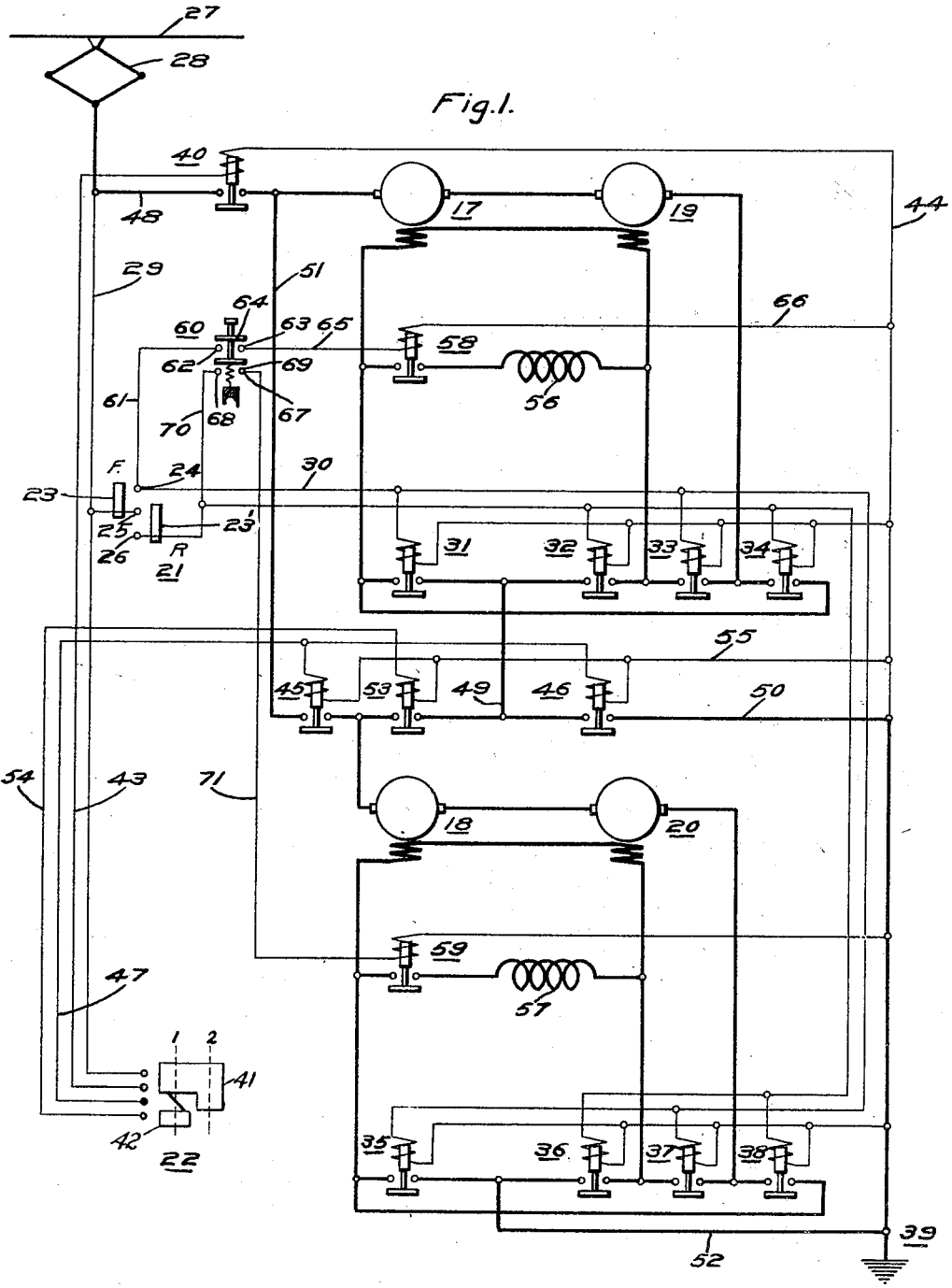

1,870,469

UNITED STATES PATENT OFFICE

FRANCIS H. SHEPARD, OF NEW ROCHELLE, NEW YORK, ASSIGNOR TO WESTINGHOUSE ELECTRIC & MANUFACTURING COMPANY, A CORPORATION OF PENNSYLVANIA

LOCOMOTIVE CONTROL SYSTEM

Application filed April 4, 1930. Serial No. 441,563.

My invention relates to a system for obtaining a high tractive effort from motor-driven vehicles.

The object of the invention is to provide for obtaining the maximum tractive effort from a motor-driven vehicle of a predetermined horsepower rating by so controlling the torque delivered to the axles by the propelling motors as to divide it in proportion to the weight imposed on the driving axles.

It is also an object of the invention to provide for selectively varying the torque delivered by the motors to compensate for changes in the distribution of the load.

Other objects of the invention will become apparent as the description proceeds.

The invention is disclosed in the embodiment thereof shown in the accompanying drawings and comprises the combination of elements and arrangement of parts that will be exemplified in the structure hereinafter set forth, and the scope of the application of which will be indicated in the claims.

For a fuller understanding of the nature and objects of the invention, reference may be had to the following detailed description, taken in connection with the accompanying drawings, in which:

Figure 1 is a diagrammatic view of a control system arranged in accordance with this invention;

Figs. 2, 3 and 4 are diagrammatic views of modified schemes for varying the torque exerted by the driving motors, and Fig. 5 is a diagrammatic view of a motor-driven vehicle which will be referred to in describing how the distribution of weight on the vehicle axles will change when the vehicle is set in motion or the direction of movement is reversed.

Referring now to the drawings, 10 designates a motor-driven vehicle of any well-known type provided with one or a plurality of trucks 11 and 12. In this illustration, the trucks 11 and 12 are provided with pairs of driving axles 13, 14 and 15, 16, respectively.

In this embodiment of the invention, propelling motors 17 to 20, inclusive, are provided for driving the axles 13 to 16, inclusive, respectively. These motors may be of any well known direct-current type commonly used for propelling vehicles.

A system suitable for controlling the operation of the motors 17 to 20, inclusive, is illustrated in Fig. 1. Since control systems of this kind are well known in the art, a detailed description will not be given.

As shown, a reverser 21 is provided for controlling the direction of movement of the vehicle. It will be explained, as the description proceeds, that, when the reverser is actuated, it functions to control the direction in which the current flows in the field windings of the motors.

A master switch or controller 22, which is generally interlocked with the reverser, is disposed for operation to set up the desired motor circuits for starting and running. Therefore, when the reverser 21 is set in a predetermined position, the master controller may be operated to first connect the motors in series-circuit relation and then in parallel-circuit relation.

In the operation of the motors, assuming that the reverser 21 is actuated to position F, which indicates forward, then a circuit is established to connect the motors 17 and 20 in series-circuit relation. It will be observed that, when the reverser is actuated to position F, the reverser contact segment 23 bridges contact fingers 24 and 25 to establish a switch-actuating circuit which extends from the trolley conductor 27, through pantograph 28, conductor 29, the contact fingers 24 and 25 of the reverser—bridged by contact segment 23—conductor 30 and the actuating coils of switches 31, 33, 35 and 37, connected in parallel, to ground at 39. In this manner, the directional switches 31, 33, 35 and 37 are actuated to their closed positions.

Upon the operation of the directional switches, the motors are connected for operation in a predetermined direction, as, for example, in the direction of the arrow shown in Fig. 5.

Assuming now that it is desired to set the vehicle in motion, the master controller 22 is actuated to position 1. When the master controller is set in position 1, a switch-actuating circuit is established for operating the line switch 40 to close the main motor circuit. As will be observed, the line-switch-actuating circuit extends from the energized conductor 29, through the contact fingers—bridged by contact segment 41 of the master controller-conductor 43, the actuating coil of switch 40 and conductor 44, to ground at 39. At the same time, an actuating circuit is established for operating the series switch 53. This switch-actuating circuit extends from the energized contact segment 42, through conductor 54, actuating coil of switch 53, and conductors 55 and 44, to ground at 39.

The main motor circuit established upon the closure of switches 40 and 53, extends from the trolley, through pantograph 28, conductor 48, line switch 40, the armatures of motors 17 and 19, connected in series-circuit relation, switch 33, the field windings of motors 19 and 17, connected in series-circuit relation, switch 31, conductor 49, switch 53, the armatures of motors 18 and 20, connected in series-circuit relation, switch 37, the field windings of motors 20 and 18, connected in series-circuit relation, switch 35 and conductor 52, to ground at 39. Therefore, as will be observed, the pairs of motors 17, 19 and 18, 20 are connected in series-circuit relation.

Assuming now that the vehicle is in motion and it is desired to change to parallel-circuit connections for the motors, then the master controller is actuated to position 2. When the master controller is advanced to its second position, the contact segment 42 is disengaged from the contact finger connected to conductor 54, and the actuating circuit for switch 53 is interrupted and this switch is permitted to open. As will be observed by reference to the drawings, the contact segment 41 of the master controller engages a contact finger to establish a switch-actuating circuit for the parallel switches 45 and 46 which may be traced from the energized contact segment 41, through conductor 47, the actuating coils of switches 45 and 46, and conductors 55 and 44, to ground at 39. In this manner, the motors are connected in parallel circuit relation, and the motor circuit extends from switch 40, through the armatures of motors 17 and 19, connected in series-circuit relation, switch 33, the field windings of motors 19 and 17, connected in series-circuit relation, switch 31, conductor 49, switch 46 and conductors 50 and 44 to to ground. A branch circuit extends from switch 40, through conductor 51, switch 45, the armatures of motors 18 and 20, connected in series-circuit relation, switch 37, the field windings of motors 20 and 18, connected in series-circuit relation, switch 35 and conductor 52, to ground at 39.

If it is desired to operate the motors in the opposite direction, the reverser may be thrown to position R, causing the contact segment 23' to bridge the contact fingers 25 and 26. In this manner, the actuating circuits for the switches 31, 33, 35 and 37 are interrupted, and actuating circuits are established for switches 32, 34, 36 and 38. The opening of one set of directional switches and the closing of another set function to reverse the direction of flow of current in the field windings of the motors and thereby the direction of rotation. Since this system and operation are well known in the art, further description is considered unnecessary.

It is well known that, in the operation of a motor-driven vehicle, the distribution of weight on the axles changes with changes in direction of movement, and with the loads drawn by the vehicle. When the motor vehicle is standing, there is a predetermined distribution of load on the axles. Assuming now that the vehicle is set in motion in the direction of the arrow, then there is a change in the distribution of load caused by the rearward thrust on the truck pins which will depend upon the weight of the superstructure of the vehicle. Further, if the load imposed on the vehicle through the coupler 9 is not directly in line with the centers of the axles, there will be a turning moment about a point in each truck which will result in the imposition of a greater load on the trailing axles of the trucks than on the leading axles. Other operating conditions, such as the reaction resulting from the operation of the motors, will also tend to change the loading of the axles.

It is well known that the tractive effort of a locomotive or other motor-driven vehicle will depend upon the adhesion of the wheels to the rails. The adhesion of the wheels is governed by the coefficient of friction of the engaging metals and the force maintaining them in engagement. Therefore, if all the driving motors are exerting the same torque, and the distribution of the weight on the axles is unequal, the driving wheels on the axles carrying the smallest weight will begin to slip before the wheels on the other axles. The result of such a condition is that the maximum tractive effort of which the locomotive is capable cannot be obtained. In order to obtain the maximum tractive effort of the locomotives, provision is made in this system for dividing the torque delivered by the motors in substantially the same ratio as the load carried by the corresponding driving axles.

Referring to Fig. 1, shunts 56 and 57 are connected across the pairs of motors 17, 19 and 18, 20, respectively. As shown, switches 58 and 59 are provided for controlling the shunts 56 and 57, respectively.

Assuming that the motor-driven vehicle is in operation and that the leading axles 13 and 15, which are driven by the motors 17 and 19, are not loaded as heavily as the axles 14 and 16 driven by the motors 18 and 20, then, in order to obtain a maximum tractive effort from the locomotive, it is necessary to provide for a predetermined ratio between the torques delivered by the pairs of motors 17, 19 and 18, 20. The ratio of the torque delivered by the different pairs of motors may be varied in a plurality of different ways. In the preferred embodiment shown in Fig. 1, provision is made for shunting the field windings of the pair of motors disposed to drive the leading axles 13 and 15 or 14 and 16 of each truck, depending upon the direction of operation.

In this embodiment of the invention, in order to permit a selective operation, a push-button switch 60 is provided and disposed to be actuated by the motorman. Assuming that the push-button switch is actuated to its closed position, then a circuit is established which extends from the energized conductor 29, through contact fingers 24 and 25—bridged by contact segment 23 of the reverser 21—conductor 61, contact fingers 62 and 63—bridged by the upper contact plate 64 of the switch 60—conductor 65, actuating coil of switch 58 and conductors 66 and 44, to ground at 39. The switch 58 is actuated to its closed position to close the shunt across the field windings of the motors 17 and 19.

It will be readily understood that the reactance coil 56 may be designed to divide the current in a predetermined proportion with the field windings. In an installation that has been made and put into service on a locomotive, provision was made for the shunt coil and the motor field windings to divide the current equally. This installation was found to be highly satisfactory and is at present in operation.

Since, in the operation of locomotives for drawing loads, the direction of movement will greatly influence the distribution of load on the axles, the push-button switch for controlling the shunt is disposed in cooperative relation to the reverser 21. However, this is not always necessary.

Assuming that the reverser stands in position R, then, upon the actuation of the push-button switch 60 to its closed position, an actuating circuit for the switch 59 is established. This circuit extends from the energized contact finger 25, through contact segment 23', contact finger 26, conductor 70, contact fingers 68 and 69—bridged by the lower contact plate of the push-button switch 60—conductor 71, the actuating coil of switch 59 and conductor 44, to ground at 39. Therefore, the shunt across the field windings of motors 17 and 19 is closed whereby the torque delivered by these motors is reduced.

From the foregoing, it will be evident that a system has been provided which is under the control of the engineer for controlling the torque delivered by the different pairs of motors and, if the shunts are designed to meet predetermined operating conditions, an operator may cause a delivery of torque by the different motors which is proportional to the load on the corresponding axles.

In the embodiment illustrated in Figs. 1 and 5, when the vehicle is moving to the left, as indicated by the arrow, the reverser stands in the position F. Then the axles 13 and 15, driven by the motors 17 and 19, respectively, are the leading axles, while the axles 14 and 16 driven by the motors 18 and 20 are the trailing axles. Assuming now that the tractive effort required from a locomotive causes the wheels on the leading axles 13 and 15 to slip, then the operator actuates the push-button switch 60 to shunt the motors 17 and 19, thereby reducing the torque delivered by these motors and permitting the motors 18 and 20 to assume a greater proportion of the load. It will be readily understood that the wheels driven by the trailing axles 14 and 16 will have greater adhesion, in view of the greater load carried by these axles.

In this manner, the torque delivered by the motor is distributed substantially in accordance with the distribution of load, and the maximum tractive effort may be obtained from the motor-driven vehicle.

Three modifications of the selective shunting means for the motors have been illustrated. Since the only change that is required to connect a system in accordance with these modifications is the changing of the motor shunts, only that much of the modified systems is illustrated.

In Fig. 2, a shunt is connected around the armatures of the motors 17 and 19. As illustrated, the shunt comprises a resistor 72 which may be designed to take any desired portion of the armature current. The shunt may be controlled by the switch 58 in the manner described for the preferred embodiment of the invention. The closing of this shunt will reduce the torque delivered by the motors.

In Fig. 3, instead of connecting the shunt across the field windings of the motors, a portion of each of the motor field windings is shunted out of the circuit. In this instance, leads 73 and 74 are brought out from the field windings of the motors 17 and 19, respectively, and the switch 58 is disposed to connect these leads and shunt out predetermined portions of the field windings of the motors 17 and 19.

The modification shown in Fig. 4 is similar to the modification shown in Fig. 3, with the exception that the switch 58 is provided with an extra contact member 75 which, when the switch 58 is operated, establishes an actuating circuit for an auxiliary switch 76 that is disposed in the conductor extending between the field windings to connect them in series-circuit relation. In operation, when the switch 58 is actuated to shunt out a portion of the field windings of the motors 17 and 19, the switch 76 is actuated to interrupt the circuit connections between the windings so that the shunted portions of the field windings do not carry any current.

Since certain changes may be made in the above construction and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a system for obtaining the maximum tractive effort from a motor-driven vehicle having a plurality of driving axles, in combination, a plurality of propelling motors for driving the axles, said motors being provided with field windings, means for controlling the direction of movement of the motor-driven vehicle, and means disposed for manual operation to cooperate with said direction-controlling means for selectively shunting predetermined motors to effect a division of the torque delivered by the motors substantially in accordance with the weights imposed on the axles.

2. In a control system for a motor-driven vehicle having a plurality of driving axles, in combination, a plurality of propelling motors for driving the axles, said motors being provided with field windings, inductive shunts for shunting the field windings of said motors to reduce the torque delivered to the driving axles, means for controlling the direction of movement of the vehicle, and manually-operable means disposed to cooperate with said direction-controlling means for selectively shunting the field windings of predetermined motors to effect a division of the torque delivered by the motors substantially in accordance with the weights imposed on the axles.

3. In a control system for a motor-driven vehicle having a plurality of driving axles, in combination, a plurality of propelling motors for driving the axles, said motors having field and armature windings, means for shunting the armature windings of said motors to reduce the torque delivered to the driving axles, means for controlling the direction of movement of the vehicle, and manually-operable means disposed to cooperate with said direction-controlling means for selectively shunting the armature windings of predetermined motors to effect a division of the torque delivered by the motors substantially in accordance with the weights imposed on the axles.

4. In a control system for a motor-driven vehicle having a plurality of driving axles, in combination, a plurality of propelling motors for driving the axles, said motors having field and armature windings disposed in series-circuit relation, means for shunting a portion of the field windings out of the motor circuit to reduce the torque delivered to the driving axles, and means for controlling the direction of movement of the vehicle for selecting the motors to be shunted to effect a division of the torque delivered by the motors substantially in accordance with the weights imposed on the axles.

5. In a control system for a motor-driven vehicle having a plurality of driving axles, in combination, a plurality of propelling motors for driving the axles, said motors having field and armature windings disposed in series-circuit relation, switching means for shunting a portion of the field windings out of the motor circuit to reduce the torque delivered to the driving axles, means for controlling the direction of movement of the vehicle, and manually-operable means disposed to cooperate with said direction-controlling means for controlling said switching means to select the motors to be shunted to effect a division of the torque delivered by the motors substantially in accordance with the weights imposed on the axles.

In testimony whereof, I have hereunto subscribed my name this 27th day of March, 1930.

FRANCIS H. SHEPARD.